Nov. 27, 1951     L. H. HUTCHINS, JR     2,576,227
NONMETALLIC ARMORED ELECTRICAL SUBMARINE CABLE
Filed Dec. 10, 1949
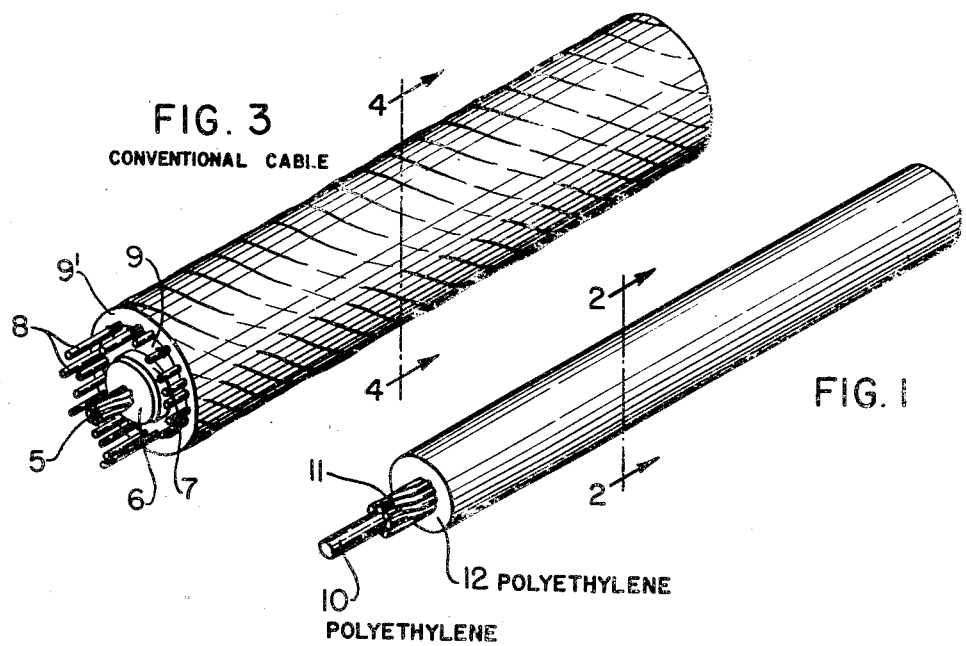
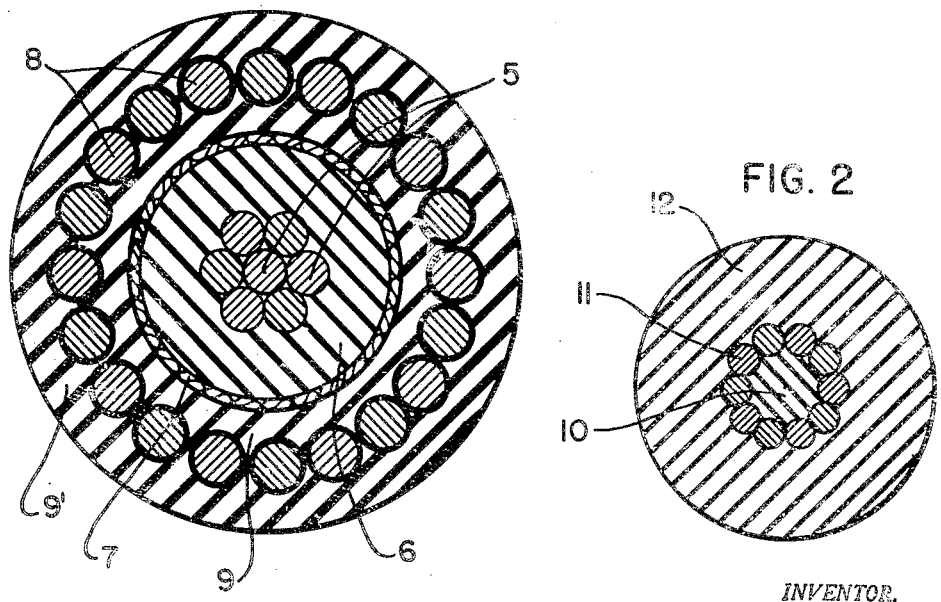
INVENTOR.
Loren H. Hutchins, Jr.
BY
ATTORNEYS

| Patented Nov. 27, 1951 | 2,576,227 |

UNITED STATES PATENT OFFICE

2,576,227

NONMETALLIC ARMORED ELECTRICAL SUBMARINE CABLE

Loren H. Hutchins, Jr., Wakefield, Mass., assignor to Simplex Wire & Cable Co., Cambridge, Mass., a corporation of Massachusetts Application December 10, 1949, Serial No. 132,268

4 Claims. (Cl. 174—107)

I have invented a novel cable construction of special utility in submarine communication cables. This cable construction consists of a particular arrangement of a particular conducting material and a particular insulating material whereby several important advantages are secured.

A submarine communication cable must meet several diverse requirements. First, it must be of construction such that it can be laid on the ocean floor, frequently at depths of several miles, and, second, when laid, it must be inert in the sea water in which it is submerged and it must provide the electrical properties essential to the intended service, sufficient dielectric resistance and, for telegraphy, a low speed coefficient, or for telephony, a low attenuation characteristic. My cable construction meets all of these requirements and, as compared to any previous construction known to me, meets them at radically reduced cost levels. Further, my cable construction affords additional important economies in handling and laying.

At depths exceeding 100 fathoms, a cable lying in the silt on the ocean floor is subject, in all normal circumstances, to virtually no physical disturbance. Hence, any cable equal to the physical stresses of laying at such depths will, once laid, meet the physical requirements. However, the physical stresses imposed on the cable during laying are enormous and hitherto have imposed design conditions which made the cable large and expensive, to lay as well as to make, or which imposed electrical limitations, or which in some instances made the design impossible of construction by reason of lack of appropriate materials or because electrical and physical requirements could not be reconciled.

To illustrate, the cable must have sufficient tensile strength to support the weight in sea water of the length of cable between the ocean floor and the laying vessel as the laying operation proceeds, and it must have sufficient compressive strength to transfer the load which this weight represents to the drum over which it is payed out from the laying vessel without mechanical failure or permanent distortion at this point of extreme stress, and it must be heavy enough to sink fast enough to keep the length of cable between the ocean floor and the pay out drum as short as possible. This length may be as much as five nautical miles or more. As the same time, the speed coefficient or the attenuation characteristic, compound functions of conductor resistance and insulation capacity, must be kept low. Available insulating materials, because of their low moduli of elasticity, contribute substantially nothing to the tensile strength of the cable construction—this is determined by one or more of the metallic elements of the construction.

By constructing the cable in accordance with my invention, I meet these several requirements with extra-ordinary economy.

The cable of my invention is constructed of cadmium-copper, 1% by weight cadmium and 99% copper, as the conducting material and polyethylene as the insulating material. The conducting material is arranged as an annulus of strands, seven or more in number, of uniform cross-section, in a single layer with an angular lay with respect to the axis of the cable on a core of polyethylene insulation. This annulus of conducting strands is encased in a jacket of polyethylene insulation circular in cross-section having an area in section, or a wall thickness over the annulus of conducting strands, such that the composite cable has a specific gravity when referred to sea water (i. e. the ratio of the weight of a given volume of cable to the weight of the same volume of sea water) of not less than 1.4 or better 1.5. This wall thickness should, in any case, be not less than 0.075". The outside diameter of the cable should, in any case, be not less than one and one-half times the outside diameter of the annulus of conducting strands. The generally accepted specific gravity of sea water is 1.025 based on pure water. Thus, the cable of my invention provides an optimum combination of physical, chemical and electrical properties at a low cost level.

The essential property of the cadmium-copper conducting elements is the product of tensile strength and conductivity. If this product is not less than 70,000, tensile strength being measured in pounds per square inch and conductivity as the ratio to pure copper, the conducting material is, or is equivalent to, the cadmium-copper alloy for the purposes of my invention. One such equivalent is silver-copper, 6½% by weight silver and 93½% copper. The essential properties of the polyethylene insulation are its specific gravity and its dielectric constant. If the specific gravity of the insulating material is less than that of sea water, that is less than 1.025 based on pure water, and the dielectric constant is not more than 3, or better 2.5, and if the compressive strength of the insulating material with respect to the weight of the composite cable is at least equal to that of polyethylene, the insulating material is, or is equivalent to, polyethylene for the purposes of my invention.

The arrangement of the conducting material as an annulus of seven or more conducting strands is an essential, and a characteristic, part of the cable construction of my invention. Only thus is the tensile strength of the total of the conducting material sufficiently developed, with respect to its weight, and the ratio of its conductivity to its weight, to provide a cable having the advantages of that of my invention. With six strands cabled around a central strand, a total of seven strands all of the same cross-section, the ratio of the outside diameter of the group of conducting strands to the diameter of a strand is 3:1; hence the characterization of an annulus of conducting strands around a core of insulating material as having a ratio, the outside diameter of the annulus to the diameter of a strand, exceeding 3:1 distinguishes my cable construction in this respect. In the superior embodiments of my invention, this ratio will be not less than 4:1.

I have referred above to the necessary relation between the strength of the composite cable and its weight in sea water in connection with the laying operation. This relation is sometimes expressed as a so-called cable modulus, the ratio of the breaking strength of the composite cable, measured in pounds for example, to the weight in sea water of a nautical mile of the cable, measured in pounds. The necessary minimum value for this modulus will vary with the maximum depth at which a particular cable is to be laid. A modulus of 4.5 is generally satisfactory for submarine installations. A modulus of 4.5, or higher, can be developed with the cable construction of my invention.

In the accompanying drawings, I have illustrated, in Figs. 1 and 2, a cable construction embodying my invention and, for comparison, in Figs. 3 and 4, a cable construction for the same service embodying the best of practices preceding my invention. Fig. 1 is a length, with parts cut away, of a cable of my invention and Fig. 2 is a section taken on line 2—2 of Fig. 1, on an enlarged scale of the same cable. Fig. 3 is a length, with parts cut away, of a cable representing prior practices, and Fig. 4 is a section taken on line 4—4 of Fig. 3, on an enlarged scale of the same cable. Figs. 1 and 3 are drawn to the same scale. Figs. 2 and 4 are drawn to the same scale, a scale larger than that of Figs. 1 and 3.

The cable illustrated in Figs. 3 and 4 consists of seven strands 5 of tinned copper having a conductivity of 100%, 0.0715" in diameter, six strands cabled about a central strand with a 2⅞" lay, diameter over conductor 0.2145", a wall of gutta percha insulation or more recently deproteinized rubber insulation or synthetic rubber insulation 6, 0.120" thick, a layer of rubber faced cotton tape 7, 0.012" thick, a serving of multiple ends of roved yarns of cutched jute 9 with a 5½" lay, 0.065" thick, nineteen strands of high tensile (minimum 171,000 pounds per square inch) steel armor wire 8 braided with tar soaked cotton with a 12¼" lay, preformed, each #14 Birmingham Wire Gauge or 0.083" in diameter, diameter over armor strands 0.790", two servings of multiple ends of plied yarns of tar impregnated jute 9' with a 4¼" lay, outside diameter 1.020" and weight, in air, 5150 pounds per nautical mile (6087 feet).

The cable of my invention illustrated in Figs. 1 and 2 consists of a central core 10 of polyethylene, outside diameter about 0.125", an annulus 11 of ten strands of cadmium-copper (1%-99%) 0.051" in diameter with a 3" lay, preformed, and a wall of polyethylene insulation 12, 0.180" thick. The diameter over the annulus 11 of conductor strands is 0.220" and the outside diameter of the cable is 0.580". The weight in air is 1080 pounds per nautical mile, that is 21% of the weight of prior cable construction for the same service. The polyethylene core 10 may, if desired in connection with the forming process, be fabricated on a metal filament of small diameter, smaller than that of the strands in the conducting annulus. The interstices between the conductor strands are with advantage filled with polyethylene insulation as the annulus 11 is formed, for example at the stranding die as the conductor strands are laid on the polyethylene core.

Cables embodying my invention larger and smaller than the cable illustrated in Figs. 1 and 2 can be fabricated. In terms of present service requirements, the illustrated cable is a relatively large cable. A relatively small cable of my invention would be illustrated by one in which 10 strands of cadmium-copper (1%-99%) 0.0265" in diameter are cabled about a central core of polyethylene insulation, diameter over the annulus of conductor strands 0.115", and covered with a wall of polyethylene insulation 0.095" thick, outside diameter of the cable 0.305".

Cadmium-copper, 1% cadmium and 99% copper, has a tensile strength in excess of 90,000 pounds per square inch and a conductivity not less than 80% of that of copper. The specific gravity of polyethylene insulation approximates 0.925 based on pure water and its dielectric constant 2.32. With a minimum thickness over the annulus of conductor strands of 0.075", the polyethylene insulation meets all physical and electrical requirements. For example, a conventional minimum requirement for dielectric resistance is 300 megohms per nautical mile—with such polyethylene insulation, dielectric resistances exceeding 100,000 megohms per nautical mile are attained. Thus, the cable construction of my invention combines the several diverse physical and electrical properties required, the strength with respect to weight required for laying, the specific gravity required to sink rapidly and the conductivity and dielectric values required for communications service. And these properties are thus combined in a cable of radically smaller compass and of much lower cost than in any cable hitherto available.

I claim:

1. A submarine cable having a cable modulus of not less than 4.5 consisting of a core of polyethylene insulation having a specific gravity of less than 1.025 based on pure water, an annulus of conducting strands for which the product of tensile strength in pounds per square inch and conductivity as the ratio to copper is not less than 70,000, said strands being at least seven in number and of uniform cross-section in a single layer with an angular lay with respect to the axis of the cable on the core, and a jacket of polyethylene insulation having a specific gravity of less than 1.025 based on pure water and a dielectric constant of not more than 3 and having a wall thickness not less than 0.075" and circular in cross-section, and having an area in section such that the composite cable has a specific gravity of not less than 1.4 based on sea water and an outside diameter not less than 1½ times that of the annulus of conducting strands.

2. A submarine cable having a cable modulus of not less than 4.5 consisting of a core of polyethylene insulation having a specific gravity of less than 1.025 based on pure water, an annulus of conducting strands for which the product of tensile strength in pounds per square inch and conductivity as the ratio to copper is not less than 70,000, said strands being at least seven in number and of uniform cross-section in a single layer with an angular lay with respect to the axis of the cable on the core, and a jacket of polyethylene insulation having a specific gravity of less than 1.025 based on pure water and a dielectric constant of not more than 3 and having a wall thickness not less than 0.075" and circular in cross-section, and having an area in section such that the composite cable has a specific gravity of not less than 1.5 based on sea water and an outside diameter not less than 1½ times that of the annulus of conducting strands.

3. A submarine cable having a cable modulus of not less than 4.5 consisting of a core of polyethylene insulation having a specific gravity of less than 1.025 based on pure water, an annulus of conducting strands for which the product of tensile strength in pounds per square inch and conductivity as the ratio to copper is not less than 70,000, said strands being at least seven in number and of uniform cross-section in a single layer with an angular lay with respect to the axis of the cable on the core, and a jacket of polyethylene insulation having a specific gravity of less than 1.025 based on pure water and a dielectric constant of not more than 2.5 and having a wall thickness not less than 0.075" and circular in cross-section, and having an area in section such that the composite cable has a specific gravity of not less than 1.5 based on sea water and an outside diameter not less than 1½ times that of the annulus of conducting strands.

4. A submarine cable having a cable modulus of not less than 4.5 consisting of a core of polyethylene insulation having a specific gravity of less than 1.025 based on pure water, an annulus of conducting strands for which the product of tensile strength in pounds per square inch and conductivity as the ratio to copper is not less than 70,000, said strands being at least seven in number and of uniform cross-section in a single layer with a substantially long angular lay with respect to the axis of the cable on the core, and a jacket of polyethylene insulation having a specific gravity of less than 1.025 based on pure water and a dielectric constant of not more than 3 and having a wall thickness not less than 0.075" and circular in cross-section, and having an area in section such that the composite cable has a specific gravity of not less than 1.4 based on sea water and an outside diameter not less than 1½ times that of the annulus of conducting strands.

LOREN H. HUTCHINS, JR.

REFERENCES CITED

The following references are of record in the file of this patent:

UNITED STATES PATENTS

| Number | Name | Date |
|---|---|---|
| 2,175,389 | Hanff | Oct. 10, 1939 |

FOREIGN PATENTS

| Number | Country | Date |
|---|---|---|
| 104,401 | Great Britain | Mar. 8, 1917 |
| 574,753 | Great Britain | Jan. 18, 1946 |

OTHER REFERENCES

Williams' publication entitled "Polythene and its Use as a Dielectric"; Post Office Electrical Journal, vol. 37, part 2, pages 40, 41 and 42; July 1944.